No. 824,691. PATENTED JUNE 26, 1906.
D. E. GOE.
SAFETY RAZOR.
APPLICATION FILED JAN. 18, 1905.
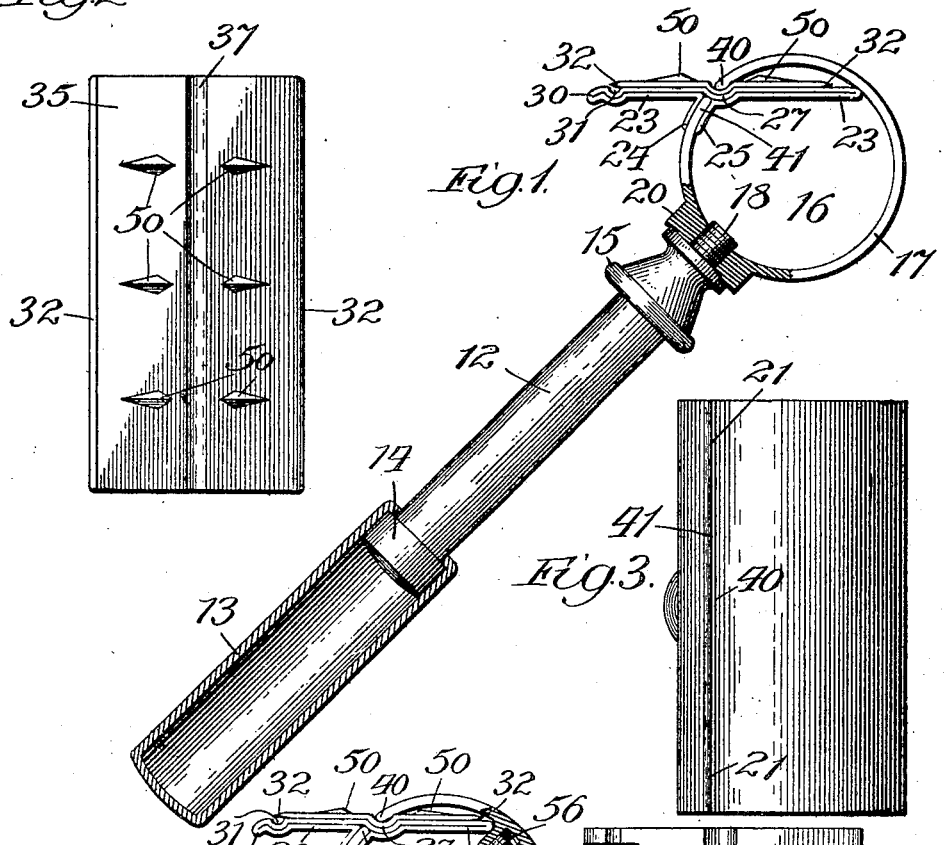
Inventor:
David E. Goe,
By Cheever & Cox
Att'ys
Witnesses:

UNITED STATES PATENT OFFICE.

DAVID E. GOE, OF MADISON, WISCONSIN, ASSIGNOR, BY MESNE ASSIGNMENTS, OF THREE-FIFTHS TO THE STEEL PRODUCTS COMPANY, OF CHICAGO, ILLINOIS, A CORPORATION OF ILLINOIS.

SAFETY-RAZOR.

No. 824,691.      Specification of Letters Patent.      Patented June 26, 1906.

Original application filed December 16, 1904, Serial No. 237,096. Divided and this application filed January 18, 1905. Serial No. 241,671.

*To all whom it may concern:*

Be it known that I, DAVID E. GOE, a citizen of the United States, residing at Madison, in the county of Dane and State of Wisconsin, have invented a certain new and useful Improvement in Safety-Razors, of which the following is a specification.

My invention relates to safety-razor blades and to mechanism for holding the blade while in use. Its object is to make such a razor and handle or holder which can be cheaply manufactured, which will be accurate and efficient in operation, and not liable to readily get out of order, and which can be easily cleaned and repaired.

My invention consists in a novel form of handle or holder adapted to have the blade mounted therein for the purpose of use, in means for securing the blade in the holder, and in many details which will be hereinafter more fully described and claimed.

Referring to the drawings, Figure 1 is a side elevation, largely in section, showing mechanism illustrating my invention in its preferred form. Fig. 2 is a plan view of my improved blade. Fig. 3 is a plan view of the holder proper with the blade-table removed. Fig. 4 is a plan view of the blade-table. Fig. 5 is a plan view of the handle in telescoped position. Fig. 6 shows a different means of attaching the blade-holder to the handle.

In the construction of my improved device I provide a handle 12 of any suitable form, but in the construction here shown made with a telescope-section 13, adapted to slide down against enlargement 14 to form the long handle shown in Fig. 1 and against the shoulder 15 to form the short handle of Fig. 5. This handle is preferably made of such a size and length that when it is closed up, as in Fig. 5, it will slide within the space 16 inside the holder 17, to be hereinafter more fully described. On the upper end of this handle are screw-threads 18, adapted to fit into an enlargement or base portion 20 of the holder 17, above referred to. This holder 17, which is one of the novel features of this invention, is in the form of a tube, here shown in the form of a cylinder, preferably of spring metal; but it may be made of any polygonal figure of equal or unequal faced sides without departing from my invention. In one side of this holder is cut a longitudinal slot, in which the blade-table and blade, to be hereinafter described, are adapted to fit.

I provide a blade-table 23, made, preferably, from a single sheet of metal, as shown, having the following features: two projecting lips or edges 24 and 25, extending downward from the main table, as shown, and forming a recess or groove in which the one or side edge of the holder 17 adjacent to the slot 21 is adapted to fit. In the upper surface of the blade-table is a notch, groove, or corrugation 27, adapted to receive a corresponding ridge or corrugation of a blade, such as is fully described and claimed in my prior application, Serial No. 237,096. This groove 27 is so located that it is engaged by the upper or side edge 40 of holder 17 adjacent to slot 21, heretofore described. On the outer edge of the blade-table are guard-teeth 30, and in the upper faces of these teeth is cut a recess or depression 31, adapted to fit in the recess 27 in the blade-table under the edge 40 of the blade-holder. This rib or recess 37 is fully described and claimed in my prior application, Serial No. 237,096. In order to give this razor-blade great rigidity, I place upon it ribs or corrugations 50, extending across the blade at approximately right angles to the cutting edge. In order to insure the blades always fitting in the same place upon the blade-table, raised members 52 may, if desired, be placed upon the top of the table to fit into the under side of the ribs or corrugations 50 in the blade 35, heretofore described.

In the operation of the device the operator takes the blade-table and places upon it the blade 35 so that they fit together in proper position. He now takes them in one hand while holding the handle and holder 17 in the other hand and shoves the blade-table and blade into the slot 21, heretofore described, until the parts assume the position shown in Fig. 1, where the blade and table are held rigidly in working position by the spring of the annular portion 17 of the holder, and the blade edge 32 being over the recess 31 in the guard-teeth is clear of them and free to do efficient work at all points of its length. The operator now takes hold of the handle and after pulling out the telescope to a satisfactory length proceeds to use the razor in the usual manner by moving the blade edge 32 over his face. When this is completed, he shoves both blade-table and blade along slot 21 out of the holder and after cleaning the parts replaces them ready for use again. If the device is to be packed to be carried about, the operator unscrews the handle at 18, closes the telescope-sections so that the handle assumes the position of Fig. 5, and places the handle in the space 16 inside the holder 17, thus enabling the whole article to be carried in very small space.

Fig. 6 illustrates a different construction for securing the holder to the handle, by which I am enabled to mechanically clamp the blade upon the blade-table in the slot in the holder. Referring to that figure, we see that I replace the screw-threaded member 18 of Figs. 1 and 5 with a non-threaded shank 55, which passes entirely through one wall and the interior of the tubular holder and engages by screw-threads 56 a lug 57 on the inside of the opposite side of the holder 17. This handle-shank 55 engages the holder 17 at approximately ninety degrees from the slot 21, and the screw-threads are so placed that by tightening the handle or turning the shank 55 in the threads 56 the holder 17 is compressed against the shoulder 59 on the handle, with the result that the opposite edges 40 and 41 of the slot 21 are mechanically compressed upon the blade. By rotating the handle 12 in the opposite direction the blade is released, and on continuing the rotation the holder and handle are disconnected, as before.

I do not wish to be understood as limiting myself to exact detail construction, which may manifestly be varied within reasonable limits without departing from my invention.

The use of an arch, groove, projection, or corrugation on a safety-razor blade in combination with means for engaging the same for holding the blade in the holder forms the subject-matter of claims in my prior application, Serial No. 237,096, filed December 16, 1904.

Having thus described my invention, what I claim as new, and desire to secure by Letters Patent, is—

1. In mechanism of the class described, the combination of a blade-holder consisting of a tubular member having a slot running lengthwise thereof and a blade-table, on which the blade is adapted to rest, on one edge of the slot of said holder.

2. In mechanism of the class described the combination of a blade-holder consisting of a tubular member, having a slot running lengthwise thereof, and a blade-table, on which the blade is adapted to rest, slidably engaging one edge of said slot of said holder.

3. In mechanism of the class described, the combination of a tubular holder having a slot running lengthwise thereof, a blade-table, on one edge of said slot, having a notch or depression on its upper face, in which the other edge of said slot is adapted to fit.

4. In mechanism of the class described, the combination of a tubular holder having a slot running lengthwise thereof, a blade-table slidably mounted on one edge of said slot and having a notch or depression in its upper face, in which the other edge of said slot is adapted to fit.

5. In mechanism of the class described, the combination of a blade-holder, consisting of a tubular member having a longitudinal slot running lengthwise thereof, a blade-table, on which the blade is adapted to rest, engaging one edge of the slot of said holder, a notch on the opposite side of said table under the opposite edge of said slot in the holder, and a razor-blade adapted to fit on said table, having a rib or corrugation on its surface, engaging said notch in the table, and engaged and held in place by the edge of the slot of the holder substantially as described.

6. In mechanism of the class described the combination of a blade-holder consisting of a tubular member, having a longitudinal slot therein in which the razor-blade is adapted to be slipped and held, a handle having a head engaging one side of the holder, a shank on the handle passing through the holder, and engaging the opposite side of the holder, and screw-threads at one point of contact of the shank and holder whereby rotating the handle in one direction compresses the holder to close its slot.

7. In mechanism of the class described, the combination of a blade-holder consisting of a tubular member having a longitudinal slot therein, in which a razor-blade is adapted to be slipped and held, a handle having a head bearing against one side of the holder, and a shank on the handle passing through the holder and engaging the opposite side thereof in screw-threads, whereby by rotating the handle the holder is compressed and the edges of the slot are drawn together.

In witness whereof I have hereunto subscribed my name in the presence of two witnesses.

DAVID E. GOE.

Witnesses:
CAROLYN RAFTERY,
DWIGHT B. CHEEVER.